No. 789,991. PATENTED MAY 16, 1905.
G. H. MILLER.
EARTH AUGER.
APPLICATION FILED JUNE 7, 1904.
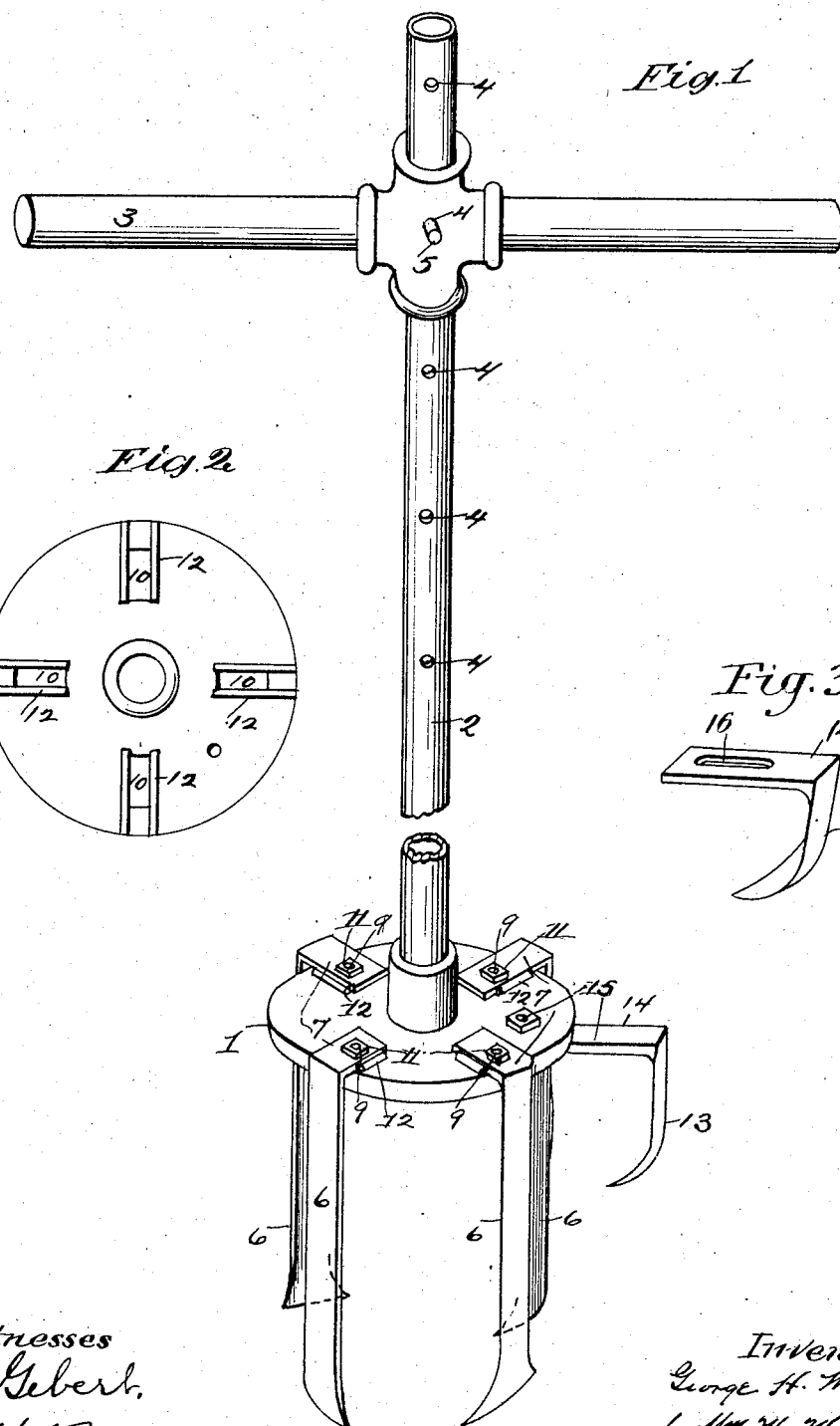
Witnesses
Inventor
George H. Miller
by Wm. H. Monroe
Attorney No. 789,991. Patented May 16, 1905.

UNITED STATES PATENT OFFICE.

GEORGE H. MILLER, OF NORWALK, OHIO.

EARTH-AUGER.

SPECIFICATION forming part of Letters Patent No. 789,991, dated May 16, 1905.

Application filed June 7, 1904. Serial No. 211,483.

*To all whom it may concern:*

Be it known that I, GEORGE H. MILLER, a citizen of the United States, and a resident of Norwalk, county of Huron, State of Ohio, have invented certain new and useful Improvements in Earth-Augers, of which I hereby declare the following to be a full, clear, and exact description, such as will enable others skilled in the art to which it appertains to make and use the same.

The invention relates to improvements in earth-augers for setting posts or post or pole anchors; and the objects of the invention are to provide an auger with adjustable blades by means of which variations in the diameter of the hole can be obtained, to provide means for raising the operating-handle as the auger is lowered into the ground, and, finally, to provide auxiliary means for enlarging a hole already bored or for adding to the diameter of the hole bored by the main portion of the anchor.

The invention consists in the disk portion to which downwardly-turned blades provided with angularly-arranged cutting edges are secured, a vertical central stem by means of which the auger is lowered in the earth, and an operating-handle or balanced levers, with the means for adjusting the various parts, and the auxiliary cutting device, as hereinafter described, shown in the accompanying drawings, and specifically pointed out in the claims.

In the accompanying drawings, Figure 1 shows a perspective view of the complete device. Fig. 2 is a plan view of auger-disk to which the blades are secured. Fig. 3 is a detail view of auxiliary blade inserted between two of the spaced main blades.

In the views, 1 is a metal disk to which is centrally secured the vertical stem 2, which is provided with the horizontal handle-bar 3, centrally sleeved over the stem. Both the stem and handle-bar are pierced at 4, and a pin 5 is inserted through the openings in the bar and stem to secure the bar therein. A number of holes in the stem at intervals permit of frequent adjustment of the handle as the auger sinks into the earth. The stem is preferably formed of hollow gas-pipe which is rigid and light. The cutting-blades 6 are narrow and bent at right angles near their upper ends at 7, so that their upper extremities can lie radially upon the upper face of the disk and can be secured thereto by bolts 9, which move in radial slots 10 in the disk, and so permit the blades to move radially in and out when the nuts 11 are loosened. The sides of the blades hang vertically, and their lower edges are curved inwardly and broadened, as well as angularly bent, so that as the blades are moved outward on their radial guides 12 the edges will cut a larger hole, and by moving them in a smaller hole can be cut. These blades are provided with cutting edges. An auxiliary cutting-blade 13 is also provided with a horizontal portion 14, which is set radially upon the disk, and for convenience upon the lower face, and adjustably secured by a bolt 15 in the same manner as the others, or the horizontal portion of the blade may be slotted at 16 to give the required adjustment. This auxiliary blade enables the operator to make a much larger hole with a small auger, and, since its only function is to assist the main portion of the auger, requires less effort in its use than an auger of commensurate size would require. The lower tips of the auxiliary blade are turned inward farther or more curved than the blades of the main portion of the auger, so as to throw the earth toward the center and not to interfere with their work.

Having described my invention, what I claim as new, and desire to secure by Letters Patent, is—

1. In an earth-auger the combination with a vertical stem or handle of a metal disk, cutting-blades secured thereon at spaced intervals, the said blades having radial portions for attachment to said disk, vertical portions provided with cutting edges and inwardly-turned lower extremities, and an auxiliary blade having a radial portion for attachment to the said disk, and a downwardly-extending portion provided with a cutting edge and a more inwardly turned lower tip than the lower tips of the main cutting-blades, the said auxiliary blade being also arranged to project at a greater distance from the disk than the main blades, substantially as described.

2. The combination in an earth-auger, of a vertical stem and adjustable handle thereon, a disk secured thereto, blades adjustably secured to said disk and extending vertically downward, and provided with vertical cutting edges and inwardly-extending tips, the main portion of said blades being regularly spaced upon said disk, and an auxiliary blade, the said auxiliary blade being secured to said disk, at the interval between two blades and extending farther from the disk than the regularly-spaced blades, substantially as described.

3. The combination with an earth-auger comprising a metal disk, a vertical stem and downwardly-extending cutting-blades, of an auxiliary downwardly-extending blade, extending outwardly beyond the main portion of the auger, substantially as described.

In testimony whereof I hereunto set my hand.

GEORGE H. MILLER.

Witnesses:
ELIZABETH BURNS,
W. R. PRUNER.